United States Patent
Parry-Williams et al.

(10) Patent No.: US 11,230,330 B2
(45) Date of Patent: Jan. 25, 2022

(54) VARIABLE AERODYNAMIC DEVICE

(71) Applicant: McLaren Automotive Limited, Surrey (GB)

(72) Inventors: Dan Parry-Williams, Richmond (GB); Tom Cordingley-Clark, Liphook (GB); Alex Alexiev, Woking (GB)

(73) Assignee: McLaren Automotive Limited, Surrey (GB)

( * ) Notice: Subject to any disclaimer, the term of this patent is extended or adjusted under 35 U.S.C. 154(b) by 177 days.

(21) Appl. No.: 16/577,623

(22) Filed: Sep. 20, 2019

(65) Prior Publication Data

US 2020/0094890 A1 Mar. 26, 2020

(30) Foreign Application Priority Data

Sep. 21, 2018 (GB) ...................................... 1815433

(51) Int. Cl.
*B62D 35/00* (2006.01)
(52) U.S. Cl.
CPC ................................. *B62D 35/007* (2013.01)
(58) Field of Classification Search
CPC .............................. B62D 35/007; B62D 35/00
See application file for complete search history.

(56) References Cited

U.S. PATENT DOCUMENTS

| | | |
|---|---|---|
| 5,454,619 A | 10/1995 | Haraway, Jr. |
| 6,196,620 B1 | 3/2001 | Haraway, Jr. |
| 9,403,564 B1* | 8/2016 | Al-Huwaider ......... B62D 37/02 |
| 2013/0187405 A1 | 7/2013 | Ballarin et al. |
| 2015/0375809 A1* | 12/2015 | Yuasa ................... B62D 35/007 296/180.1 |
| 2016/0059911 A1* | 3/2016 | Shiga ................... B62D 35/007 296/180.5 |
| 2016/0236728 A1 | 8/2016 | Al-Huwaider |
| 2017/0088193 A1* | 3/2017 | Heil ........................ G01M 9/08 |
| 2018/0001944 A1* | 1/2018 | Causley ................. B62D 37/02 |
| 2018/0043946 A1* | 2/2018 | Barber ..................... B62D 37/02 |
| 2018/0281669 A1* | 10/2018 | Dziurda ................. B62D 37/02 |
| 2019/0009842 A1* | 1/2019 | Biancalana .......... B62D 35/007 |
| 2019/0233023 A1* | 8/2019 | Huebener .............. B62D 37/02 |
| 2019/0248430 A1* | 8/2019 | Kim ....................... B62D 35/007 |
| 2019/0382063 A1* | 12/2019 | McAfee ................. B60J 10/767 |

(Continued)

FOREIGN PATENT DOCUMENTS

| | | |
|---|---|---|
| CN | 104843092 A | 8/2015 |
| CN | 105000076 A | 10/2015 |

(Continued)

OTHER PUBLICATIONS

Search Report for corresponding GB Appl No. 1815433.6, dated Feb. 8, 2019.

(Continued)

*Primary Examiner* — Lori L Lyjak
(74) *Attorney, Agent, or Firm* — Fish & Richardson P.C.

(57) ABSTRACT

A vehicle comprising: a vehicle body comprising a first body panel; and a first variable aerodynamic device comprising: a first spoiler that is resiliently deformable between a lowered position and a raised position, the first spoiler being formed from part of the first body panel; and a first actuator configured to move the first spoiler between the lowered position and the raised position.

22 Claims, 9 Drawing Sheets

(56) References Cited

U.S. PATENT DOCUMENTS

2020/0283078 A1* 9/2020 Czapka ................ B62D 35/007
2020/0369331 A1* 11/2020 Ferri .................... B62D 35/008

FOREIGN PATENT DOCUMENTS

| DE | 29803027 U1 | 4/1998 | | |
|----|----|----|----|----|
| DE | 10214475 A1 | 2/2003 | | |
| FR | 3089941 A1 * | 6/2020 | ........... | B62D 35/007 |
| GB | 2189199 A | 10/1987 | | |
| JP | S573076 | 1/1982 | | |
| JP | H07-69248 A1 | 3/1995 | | |

OTHER PUBLICATIONS

Search Report for corresponding GB Appl No. 1815433.6, dated Aug. 29, 2019.

* cited by examiner

VARIABLE AERODYNAMIC DEVICE

This application claims priority to UK Patent Application No. 1815433.6 filed on Sep. 21, 2018, the entire contents of which are incorporated herein by reference.

This invention relates to a vehicle comprising a variable aerodynamic device and a vehicle comprising two variable aerodynamic devices.

Many cars are fitted with fixed aerodynamic devices to improve downforce or reduce drag. Some of these can be adjusted and then re-fixed in place whilst the car is stopped. Other cars have aerodynamic devices that can be adjusted whilst the car is in motion. Such aerodynamic devices may be positioned in regions of the car where there is airflow over the car, the path of which can be changed by the aerodynamic devices.

These moveable aerodynamic devices generally move between a retracted position to a deployed position to provide different aerodynamic effects depending on the position of the moveable aerodynamic device. The aerodynamic device is generally formed of one or more separate wing elements that can move relative to the body of the vehicle. These wings may stand proud of the vehicle in at least some positions of the aerodynamic device so that air can flow on both sides of the wing element(s). In alternative designs air flows only over one side of the wing element(s) but they are still formed of discrete elements distinct from the body of the vehicle. The edges of the wing elements, especially the leading and rearward edges, can cause disruptions to the air flowing over the vehicle body and aerodynamic devices. This can have an impact on the drag generated by the vehicle as these disruptions can provide resistance to the air flow and so make it harder for the vehicle to pass through the body of air.

Therefore, it would be desirable to have a vehicle with an improved variable aerodynamic device that presents a smoother path to air flowing over it to generate less drag.

According to a first aspect of the present invention there is provided a vehicle comprising: a vehicle body comprising a first body panel; and a first variable aerodynamic device comprising: a first spoiler that is resiliently deformable between a lowered position and a raised position, the first spoiler being formed from part of the first body panel; and a first actuator configured to move the first spoiler between the lowered position and the raised position.

The first body panel may comprise a first region and a second region, the first region may form a fixed portion of the vehicle body and the second region may form the first spoiler. The first region and second region of the first body panel may be connected together seamlessly. The first body panel may be formed of reinforcing material and a matrix material binding the reinforcing material together, and the reinforcing material may run between the first region and the second region.

The first body panel may form a hinge for the first spoiler to be resiliently deformable between the lowered position and the raised position. The first spoiler may form a generally arcuate shape in a longitudinal cross-section when in the raised position. The vehicle may have a front and a rear, and the spoiler may be located at a rear portion of the vehicle. The spoiler may have a front and a rear, and the rear of the spoiler may form part of the rear of the vehicle.

The first variable aerodynamic device may comprise a rocker configured to pivot about a rotational axis located at a first position on the rocker, the rocker may be pivotally connected to the actuator at a second position on the rocker and pivotally connected to the spoiler at a third position on the rocker, the second and third positions may be either side of the first position. The first variable aerodynamic device may comprise a first connecting arm configured to pivot about a rotational axis located at a first position on the first connecting arm, the first connecting arm may be pivotally connected to the spoiler at a second position, and a second connecting arm connected to the first connecting arm so as to rotate with the first connecting arm and may be positionally fixed relative to the first connecting arm, the second connecting arm may be pivotally connected to the actuator at a third position, the third position may be towards the second position along the second connecting arm. The vehicle may comprise a rear diffuser, the vehicle may have an underside and a rear, and the rear diffuser may comprise an air channel configured to direct air from the underside of the vehicle to an outlet at the rear of the vehicle, the spoiler may be aligned with the outlet of the air channel.

The vehicle body may comprise a second body panel, and the vehicle may comprise a second variable aerodynamic device comprising: a second spoiler that is resiliently deformable between a lowered position and a raised position, the second spoiler being formed from part of the second body panel; and a second actuator coupled to the second spoiler for moving the spoiler between the lowered position and the raised position. The first body panel and the second body panel may be the same body panel. The first spoiler and second spoiler may be located on opposite sides of a longitudinal centreline of the vehicle. The first and second spoilers may be spaced apart from each other by a portion of the vehicle body. The first and second actuators may be mechanically linked to move their respective spoilers in unison. The vehicle may comprise a rear diffuser, the vehicle may have an underside and a rear, and the rear diffuser may comprise: a first air channel configured to direct air from the underside of the vehicle to a first outlet at the rear of the vehicle; and a second air channel configured to direct air from the underside of the vehicle to a second outlet at the rear of the vehicle, the first and second air channels may be located on opposite sides of a longitudinal centreline of the vehicle; and the first and second spoilers may be aligned with the first and second outlets of the air channels respectively.

According to a second aspect of the present invention there is provided an automobile comprising: an automobile body having a rear; and two variable aerodynamic devices positioned at the rear of the automobile body to either side of a longitudinal centreline of the automobile.

The vehicle may comprise a rear diffuser, the vehicle may have an underside and a rear, and the rear diffuser may comprise: a first air channel configured to direct air from the underside of the vehicle to a first outlet at the rear of the vehicle; and a second air channel configured to direct air from the underside of the vehicle to a second outlet at the rear of the vehicle, the first and second air channels may be located on opposite sides of a longitudinal centreline of the vehicle; and the two variable aerodynamic devices each may be aligned with a respective one of the first and second outlets of the air channels.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle comprising a vehicle body comprising a first body panel; and a first variable aerodynamic device. The first variable aerodynamic device comprises a first spoiler that is resiliently deformable between a lowered position and a raised position. The first spoiler being formed from part of the first body panel. The first variable aerodynamic device also comprises a first actuator configured to move the first spoiler between the lowered position and the raised position. The vehicle may be an automobile. The first spoiler may be configured to act on a rearwardly moving air flow. The air flow may move over an upper surface of the vehicle. The spoiler may be located on an upper surface of the vehicle. The spoiler may act on the rearwardly moving air flow differently depending on whether it is in the lowered position or the raised position. The first body panel forms part of an exterior shell of the vehicle.

Figure 1:
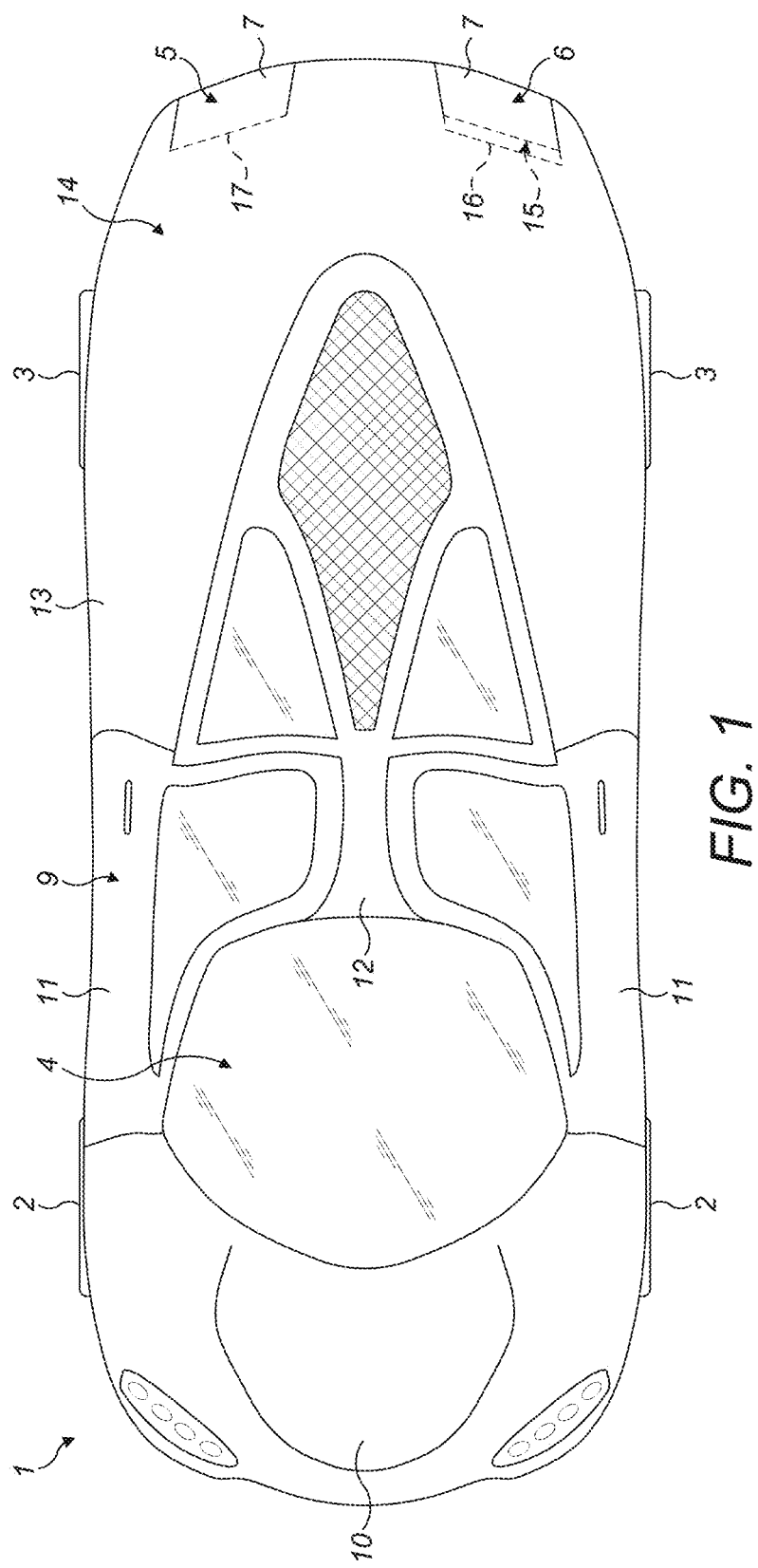
FIG. 1 shows a plan schematic view of a vehicle comprising a pair of variable aerodynamic devices (VADs).
Figure 2:
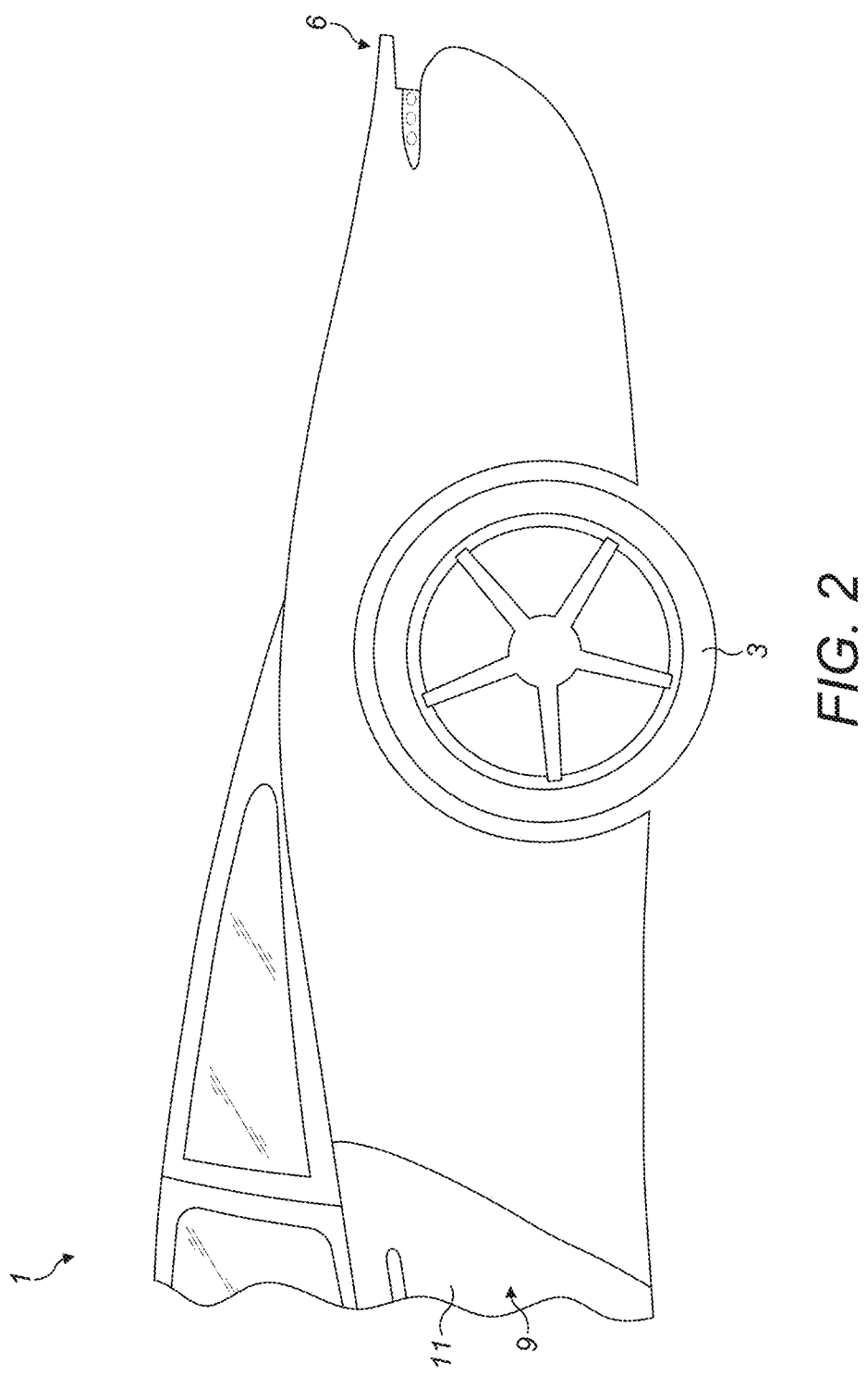
FIG. 2 shows a side schematic view of the vehicle comprising a pair of VADs.
Figure 3:
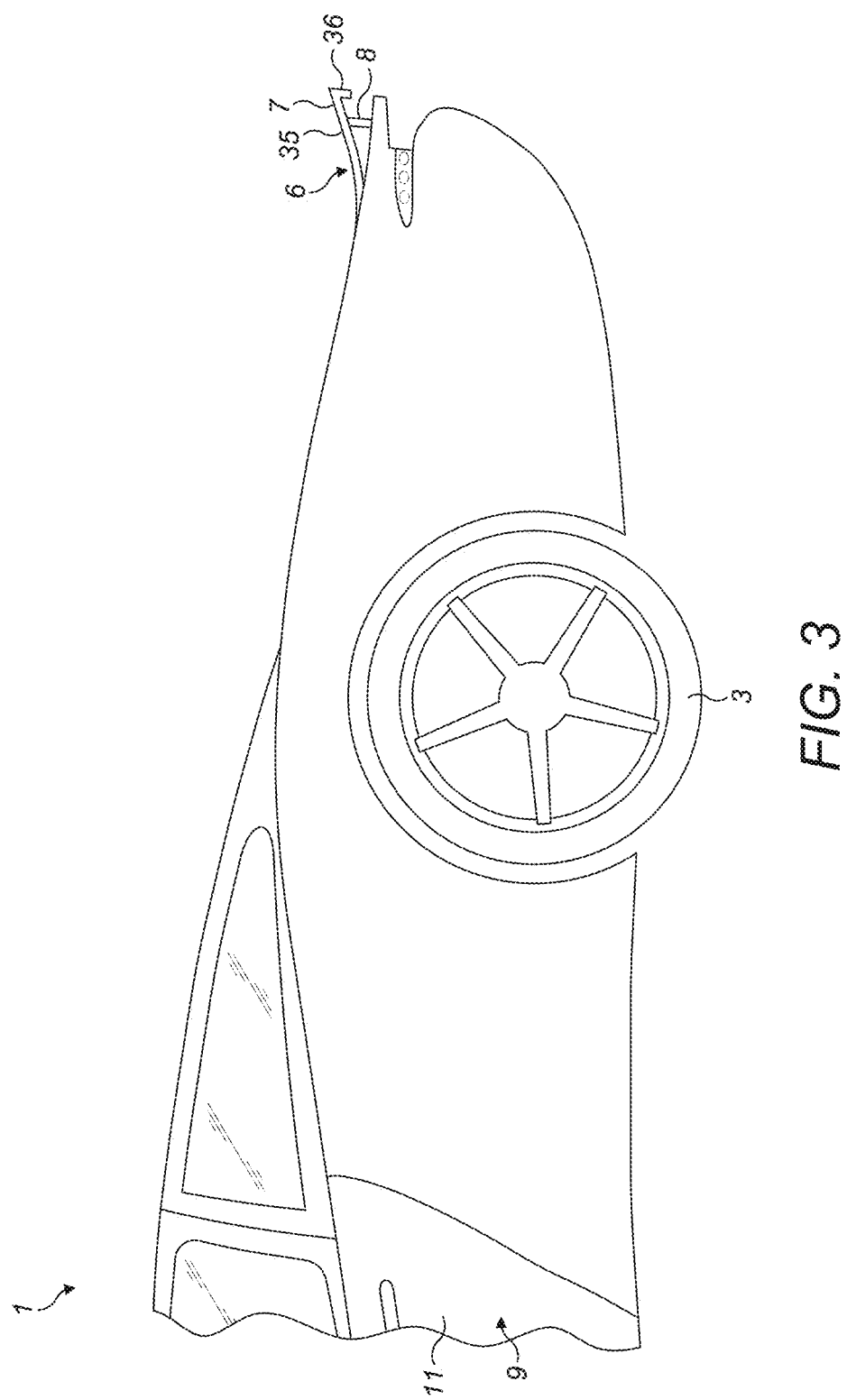
FIG. 3 shows a side schematic view of the vehicle comprising a pair of VADs showing a VAD in a raised position.

FIGS. 1, 2 and 3 show a vehicle 1. The vehicle may be an automobile. The vehicle may be a car. The vehicle comprises front wheels 2 and rear wheels 3. The front of the vehicle 1 is defined with reference to the primary motion direction of the vehicle 1. The front of the vehicle 1 points in the primary motion direction of the vehicle. Generally, a vehicle has a primary motion direction that is the forward direction. The vehicle 1 comprises an occupant compartment 4. The occupant compartment 4 may comprise one or more seats for occupants of the vehicle to sit in. The occupant compartment 4 may accommodate a driver. The occupant compartment may accommodate one or more passengers. The vehicle 1 may comprise controls located within the occupant compartment 4 to enable an occupant to control the motion of the vehicle.

The vehicle comprises a vehicle body 9. The vehicle body 9 comprises a plurality of body panels. For example, the body panels may include bonnet panel(s) 10, side door panel(s) 11, roof panel(s) 12, and rear deck panel(s) 13. Each of these listed example areas of body panels may be formed of one or more body panels.

The vehicle 1 comprises one or more variable aerodynamic devices (VADs). As shown in FIG. 1, the vehicle 1 comprises a two rear VADs 5, 6. The rear VADs 5, 6 are mounted to the vehicle 1. The rear VADs 5, 6 are mounted at a rear portion of the body of the vehicle 1. The vehicle body 9 may be the collection of parts that form the main structure of the vehicle 1. The rear VADs 5, 6 each comprise a spoiler 7 and an actuator 8. The spoiler 7 is configured to shape the flow of air moving over an upwardly facing surface of the spoiler 7. The upwardly facing surface is the side of the spoiler 7 that faces away from the rest of the vehicle 1. Thus, the upwardly facing surface is the side of the spoiler 7 that forms part of the exterior surface of the vehicle 1.

The spoiler 7 is shown in a lowered position in FIGS. 1 and 2. The spoiler 7 is shown in a raised position in FIG. 3. The spoiler 7 is resiliently deformable between the lowered position and the raised position. Resiliently deformable means that the spoiler is configured to be moveable between the lowered and raised positions without failure to the material that forms the spoiler. (E.g. cracking or permanent deforming over a normal lifetime of the part.) I.e. the spoiler bends to move between the lowered position and raised position. As shown in FIG. 1 particularly, the spoiler 7 is formed from part of a first body panel 13 of the vehicle 1. There is no break in the surface of the material between the part of the first body panel 13 that forms the spoiler 7 and the other, adjoining, part of the first body panel 13. In the example shown in FIGS. 1 to 3, the first body panel 13 forms at least part of the rear deck of the vehicle 1. The first body panel 13, and hence the spoiler 7, are formed of a material that can be resiliently deformed. The first body panel 13 as a whole may only be partially formed of material that can be resiliently deformed.

The first body panel 13 may comprise different regions that have different material properties. A first region, as shown generally at 14, may form a fixed portion of the vehicle body. A fixed portion of the vehicle body means a portion of the vehicle body that in use is intended to remain in a fixed position relative to the rest of the vehicle body. A second region, as shown generally at 15 and by dotted line 16 and the shape of spoiler 7, may be a flexible portion of the vehicle body. This region may be formed so that its material properties are more flexible meaning that the region can accommodate being resiliently deformed. Bend line 17 (represented as a dashed line) shows the line along which the spoiler 7 starts to bend when moved between the lowered position and the raised position. As shown in FIG. 1, the region of material that has material properties that permit the material to be resiliently deformed may extend beyond bend line 17 so that there is not a failure in the material at the bend line 17.

Forming the spoiler 7 from part of the first body panel is advantageous because there is no break in the vehicle body between the upper deck 14 of the vehicle 1 and the spoiler. This allows for a cleaner airflow over the vehicle body and on to spoiler 7. Such a clean airflow means that less drag is produced by the spoiler 7 than would be the case if the spoiler 7 was formed from a discrete, separate element.

As shown in FIG. 3, the spoiler can be moved to a raised position. The spoiler comprises a front and a rear. The front of the spoiler is attached to the rest of the body panel it is formed from. Thus, the front of the spoiler in both the raised position and lowered position is aligned with the part of body panel that the spoiler is attached to. The front edge of the spoiler forms a continuous profile with the rest of the body panel. The rear of the spoiler is free to move between the lowered position and the raised position, with the portion of the spoiler that connects the front and rear of the spoiler also being free to move to follow the rear edge of the spoiler. In the raised position, the rear of the spoiler is higher than when the rear of the spoiler is in the lowered position.

As shown in FIG. 3, the spoiler 7 may comprise a top portion 35 and a rear lip 36. The rear lip 36 extends in a direction perpendicular to the general direction of the top portion 35. The rear lip 36 may be present so that when the spoiler 7 is in the lowered position, the spoiler 7 has the same profile as the surrounding parts of the vehicle body.

As discussed herein, each VAD 5, 6 comprises at least one actuator 8 that is coupled to the first spoiler. The coupling of the actuator 8 to the spoiler 7 may be such that the actuator 8 is connected to the spoiler 7. This may be a direct connection between the actuator 8 and the spoiler 7. Alternatively, one or more linkages may be connected between the actuator 8 and the spoiler 7 to permit the actuator 8 to act upon the spoiler. The coupling of the actuator 8 to the spoiler 7 may be such that the actuator 8 merely touches the spoiler 7 rather than being connected to the spoiler 7. In this case the actuator 8 may press against the underside of the spoiler 7 to provide force to the spoiler to move the spoiler between the raised and lowered positions.

The actuator 8 is configured to move the spoiler between the lowered position and the raised position. The actuator 8 may be configured to provide force to the spoiler 7 to move it both towards the raised position and also towards the lowered position. This may occur when the spoiler 7 does not have any natural bias to one of the two end positions and so requires the application of force from the actuator 8 to move it to any of the positions. The spoiler 7 may be biased towards the lowered position. In this case, the actuator 8 controls the position of the spoiler from the lowered position by providing force to the spoiler to move it from the lowered position. To move the spoiler back to the lowered position, the actuator reduces the amount of force being applied to the spoiler which then permits the spoiler to move back to the lowered position. In this case, the actuator may be configured to only generate force in one direction. I.e. it can push against the spoiler to move it towards the raised position but not pull the spoiler towards the lowered position.

Figure 4:
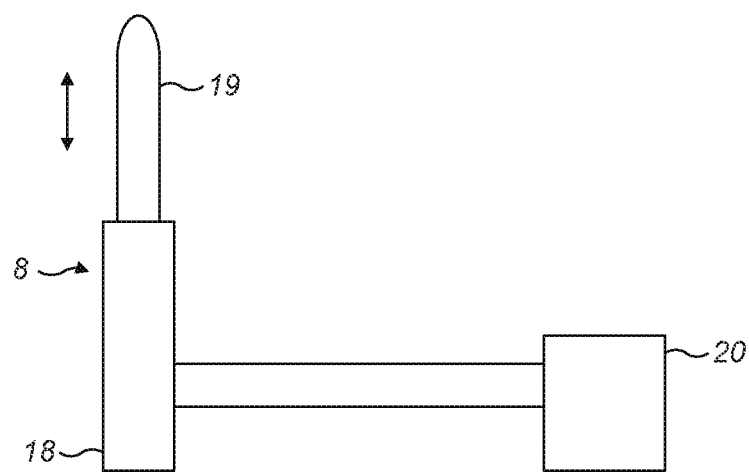
FIG. 4 shows a schematic diagram of an actuator.

The actuator 8 may be a linear actuator. The actuator may be a hydraulic ram. The actuator may be an electric linear actuator. FIG. 4 shows a schematic diagram of an actuator. The actuator 8 may comprise an actuator body 18 and an actuator rod 19. The actuator rod 19 is moveable along actuator body 18 to enable the length of the actuator to vary. The actuator rod 19 can apply force to a body, such as the spoiler 7, that is either in contact with the actuator rod 19 or connected to it. The actuator body 18 is mounted to part of the vehicle body so that the actuator 8 can apply force to the spoiler 7. The actuator 8 is connected to a control unit 20 to control the movement of the actuator 8. The control unit 20 may be a discrete unit or may be part of a more general vehicle management system. The actuator may be controlled to move the spoiler between the lowered position and raised position in dependence on factors determined by the vehicle management system. For instance, based on the current speed of the vehicle, whether the brakes of the vehicle have been applied, or if a particular dynamic mode has been selected for the vehicle 1.

Figure 8:
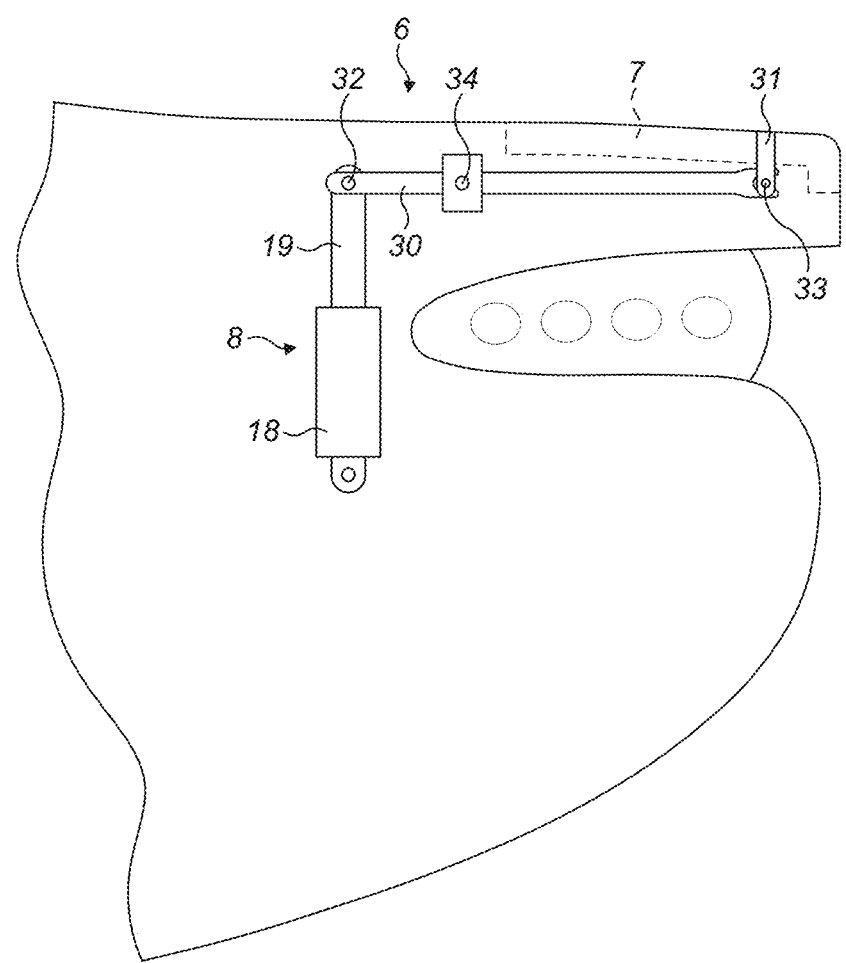
FIG. 8 shows a schematic illustration of connection linkages connecting an actuator to a spoiler of the VAD.

FIG. 8 shows an example configuration of the connection between the actuator 8 and the spoiler 7. In this case, the actuator 8 is not connected directly to the spoiler 7. This is in part because the tail region of a car can be quite thin and so not have sufficient room for the actuator. The actuator 8 is pivotally connected to a rocker 30 at a first position 32. The rocker 30 is pivotally connected to spoiler 7 at a second position 33. The rocker 30 is shown as being connected to spoiler 7 by a connecting member 31. Thus, the rocker 30 may be pivotally connected to the connecting member 31 which is coupled to the spoiler 7. The connecting member 31 may be attached to the underside of spoiler 7 to permit force to be transferred to the spoiler 7 from the actuator 8. Alternatively, connecting member 31 may contact with the underside of spoiler 7 to permit force to be transferred to spoiler 7 from the actuator 8. The pivotal connection between rocker 30 and the connecting member 31 may permit translational motion of the second position 33. This may be required to permit the spoiler 7 to bend correctly when upward force is applied to the spoiler 7. The rocker 30 may comprise a U-shaped aperture into which a pin is received. The pin being the pivotal connection between the rocker 30 and the connecting member 31. Rocker 30 is pivotally attached to the vehicle body at a third position 34 between the first and second positions 32, 33. Thus, a movement of the actuator 8 causes a movement of the spoiler 7.

The actuator rod 19 may be attached to the rocker 30 and the actuator body 18 may be attached to the vehicle body.

Figure 9A:
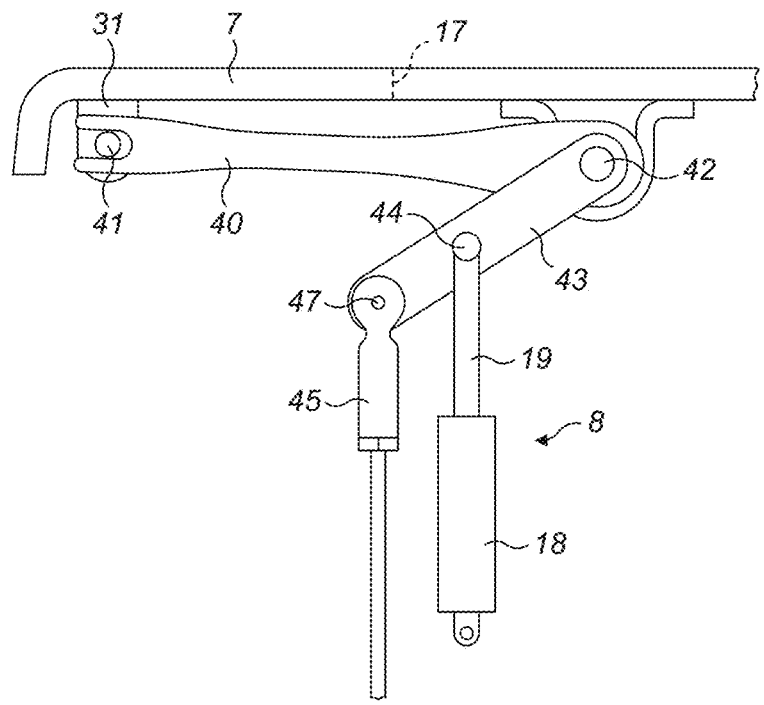
FIGS. 9A and 9B show schematic illustrations of connection linkages connecting an actuator to a spoiler of the VAD.

FIG. 9A shows a second example configuration of the connection between the actuator 8 and the spoiler 7. In this case, the actuator is not connected directly to the spoiler 7. Again, this is in part because the tail region of a car can be quite thin and so not have sufficient room for the actuator. The actuator 8 is connected to the spoiler 7 by a first actuation mechanism. A first connecting arm 40 is pivotally connected to the spoiler at a first position 41. The first connecting arm 40 is shown as being connected to spoiler 7 by a connecting member 31. Thus, the first connecting arm 40 may be pivotally connected to the connecting member 31 which is coupled to the spoiler 7. The connecting member 31 may be attached to the underside of spoiler 7 to permit force to be transferred to the spoiler 7 from the actuator 8. Alternatively, connecting member 31 may contact with the underside of spoiler 7 to permit force to be transferred to spoiler 7 from the actuator 8. The pivotal connection between first connecting arm 40 and the connecting member 31 may permit translational motion of the first position 41. This may be required to permit the spoiler 7 to bend correctly when upward for is applied to the spoiler 7. The first connecting arm 40 may comprise a U-shaped aperture into which a pin is received. The pin being the pivotal connection between the first connecting arm 40 and the connecting member 31. First connecting arm 40 is pivotally attached to the vehicle body at a second position 42.

A second connecting arm 43 is attached to first connecting arm 40 so that the first and second connecting arms are positionally fixed relative to each other. The second connecting arm 43 rotates with the first connecting arm 40. The second connecting arm 43 is attached to the first connecting arm 40 along the rotation axis associated with the second position 42. The second connecting arm 43 is connected to the first connecting arm 40 so that the second connecting arm 43 extends from the second position 42 towards the first position 41. Thus, a rotation of the second connecting arm 43 causes the first connecting arm 40 to also rotate. The actuator 8 is pivotally connected to the second connecting arm 43 at a third position 44 along the second connecting arm 43. The third position 44 being located towards the first position 41 along the second connecting arm 43. Thus, a movement of the actuator 8 causes a movement of the spoiler 7. The actuator rod 19 may be attached to the second connecting arm 43 and the actuator body 18 may be attached to the vehicle body. The first connecting arm 40 and the second connecting arm 43 can together be considered to be a rocker as described with reference to FIG. 8.

Also attached to the second connecting arm 43 is a first end of a Bowden cable 45. The Bowden cable 45 may be pivotally attached to the second connecting arm 43 at a fourth position 47 on the second connecting arm 43. The fourth position 47 may be located to the opposite end of the second connecting arm 43 from the connection between the second connecting arm 43 and the first connecting arm 40. The second end of the Bowden cable may be attached to a second actuator mechanism that is used to control a second spoiler. The Bowden cable causes the two actuator mechanisms to have synchronised movement. Thus, the two actuators are mechanically connected to synchronise their movements.

Figure 9B:
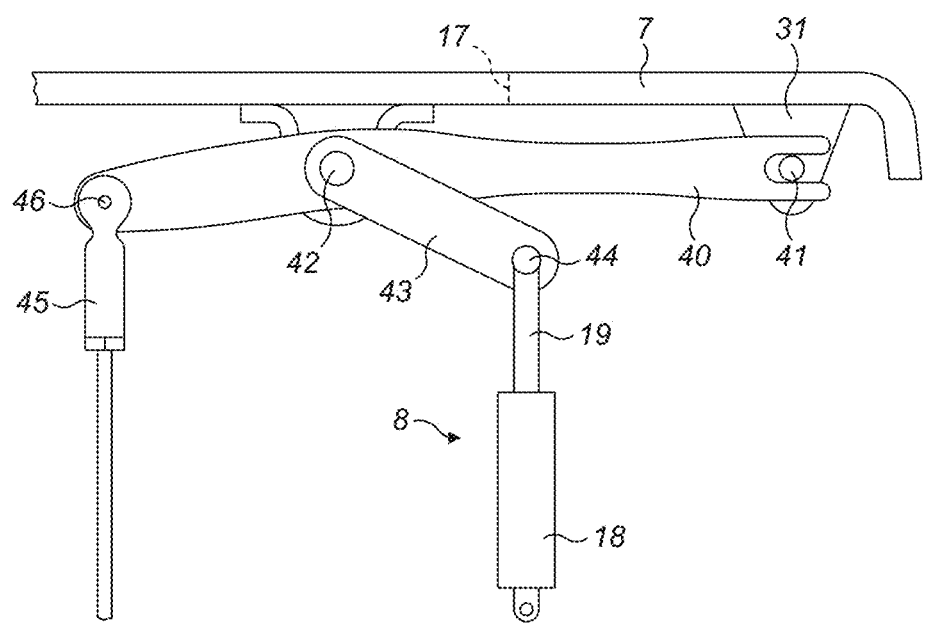

FIG. 9B shows a third example configuration of the connection between the actuator 8 and the spoiler 7. The third example is similar to the second example shown in FIG. 9A. However, in the third example the Bowden cable 45 is attached to the first connecting arm 40 rather than the second connecting arm 43. The Bowden cable 45 is pivotally attached to the first connecting arm 40 at a fifth position 46. The fifth position 46 being located to the opposite end of the first connecting arm 40 from the connection between the first connecting arm 40 and the spoiler 7. I.e. at the opposite end of the first connecting arm 40 from the first position 41.

The second example and the third examples could be used together on the same vehicle. For instance, one on the left hand side of the vehicle and one on the right hand side of the vehicle.

Figure 5A:
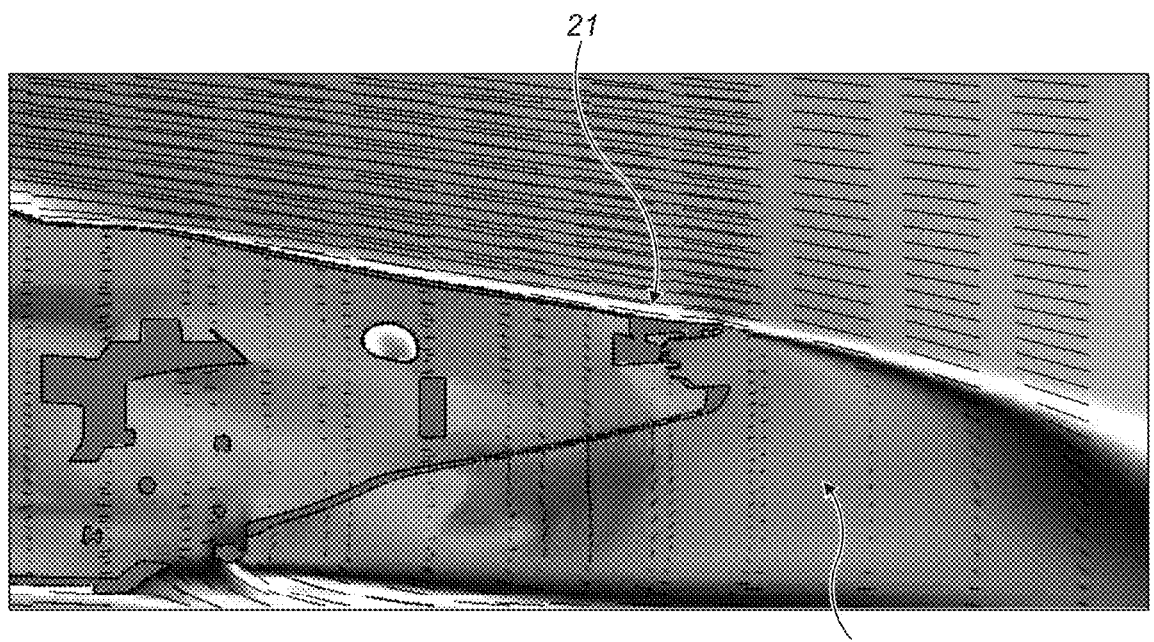
FIG. 5A shows an illustration of the effect of the vehicle on a rearwardly moving airflow when the VAD is in a lowered position.
Figure 5B:
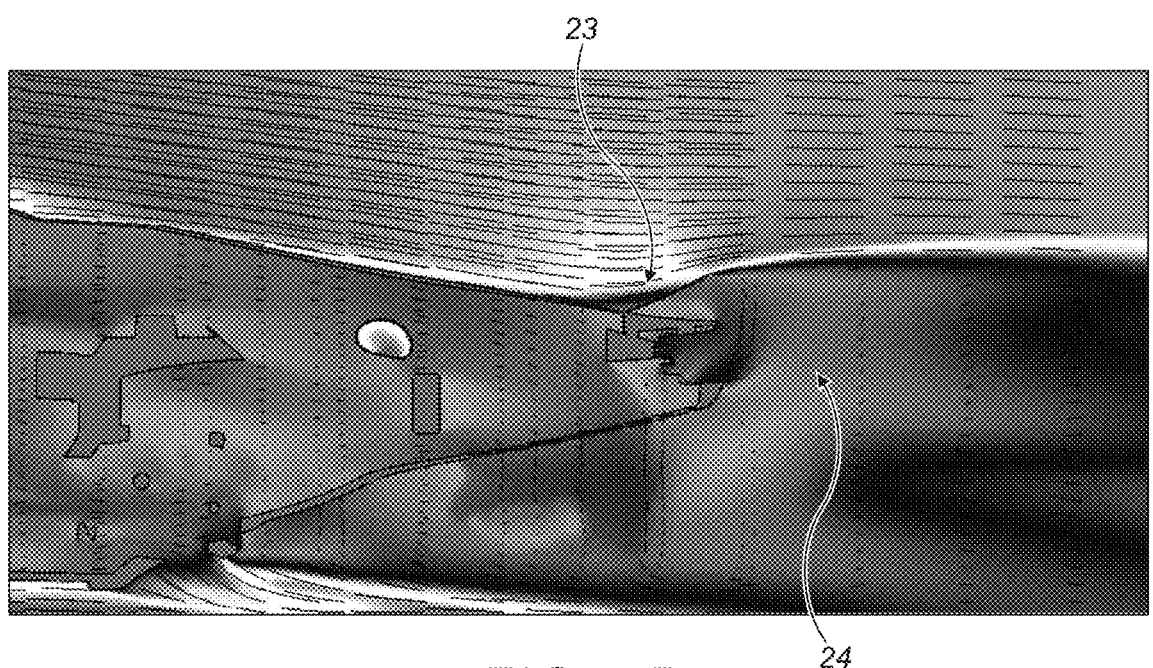
FIG. 5B shows an illustration of the effect of the vehicle on a rearwardly moving airflow when the VAD is in a raised position.

FIGS. 5A and 5B show how a rearwardly moving airflow over the vehicle can be changed depending on whether the spoilers 7 are in a raised position or a lowered position. FIG. 5A shows the spoilers 7 in a lowered position. This figure shows the advantageous effect of integrating the spoiler 7 into a body panel because there is no disruption to the rearward moving airflow in the region 21 of the front edge of the spoiler 7. The airflow close to the upper rear surface of the vehicle (i.e. the boundary layer) stays generally attached to this surface over the length of the vehicle. This is shown by the generally lighter region in FIG. 5A. In the lowered spoiler position, the vehicle creates a smaller area 22 of disrupted air behind the vehicle when compared to the raised spoiler position shown in FIG. 5B. FIG. 5B shows the spoilers 7 in a raised position. This figure shows that the rearwardly moving airflow that was following the upper surface of the vehicle body (i.e the boundary layer) is directed in a more upward direction by the spoiler 7 (as shown at 23) being in the raised position relative to the spoiler being in the lowered position. This creates a larger area 24 of disrupted are behind the vehicle when compared to the lowered position. This larger area of disrupted air can generate downforce on the vehicle which can stabilise the vehicle at high speed and under braking.

Figure 6:
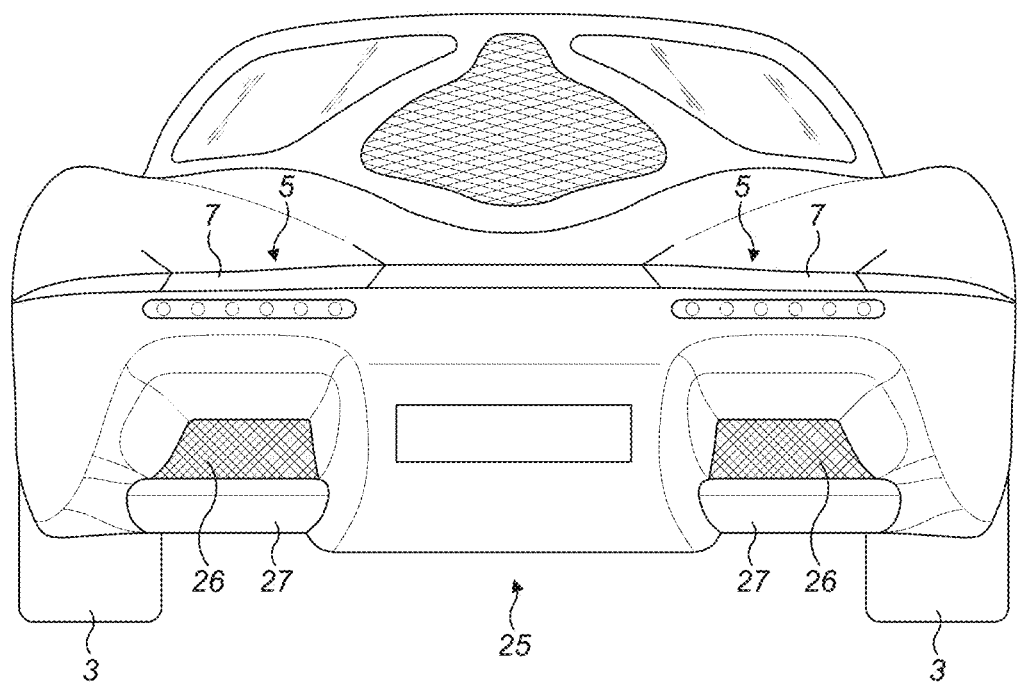
FIG. 6 shows a rear schematic view of the vehicle comprising a pair of VADs.

FIG. 6 shows a rear schematic view of the vehicle 1. The vehicle 1 may comprise a rear diffuser 25. The rear diffuser 25 is shaped to decelerate a rearwardly moving airflow from underneath the vehicle that is exiting at the rear of the vehicle and direct the air to expand into the region directly behind the vehicle. The assistance in the expansion of the air behind the vehicle 1 reduces drag on the vehicle. In addition, the rear diffuser 25 helps increase downforce by assisting the flow of air under the vehicle 1 by giving the flow of air a less impeded exit from behind the vehicle. The rear diffuser 25 can comprise a plurality of aerodynamic elements such as channels 26 and wings 27.

As shown in FIG. 5B, when the spoiler 7 is in the raised position the region 24 of disrupted air behind the vehicle is larger than when the spoiler 7 is in the lowered position. This assists the downforce effect generated by the rear diffuser 25 because it reduces the resistance the rearward airflow underneath the vehicle 1 encounters when exiting the rear diffuser 25.

The rear diffuser may comprise two air channels 26 positioned on opposite sides of a longitudinal centreline of the vehicle. The two spoilers 7 may be positioned so as to be aligned with those two air channels 26 as shown in FIG. 6. The spoiler may be aligned in a vertical direction with an air channel of the diffuser. This is advantageous because the effect on the air to the rear of the vehicle when the spoiler 7 is in the raised position is localised to those areas where air from the underside of the vehicle is expelled by the rear diffuser, when the vehicle is in forward motion. As shown in FIGS. 1 and 6, the two spoilers 7 are spaced from each other either side of the longitudinal centreline of the vehicle 1. There is a portion of the vehicle body located between the two spoilers 7. This portion of the vehicle body is static. I.e. it does not form part of either VAD 5, 6.

Figure 7A:
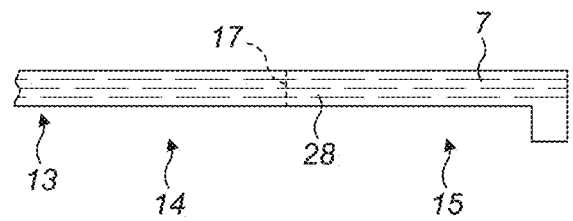
FIGS. 7A, 7B, 7C and 7D show example material configurations of the body panel comprising the VAD.
Figure 7B:
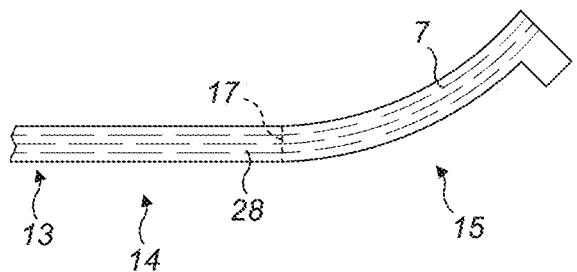

An example construction of the body panel comprising the spoiler will now be explained with reference to FIGS. 7A and 7B. FIGS. 7A and 7B show a cross-sectional view of the body panel 13 comprising a spoiler 7. FIG. 7A shows the body panel 13 with the spoiler 7 in the lowered position. FIG. 7B shows the body panel 13 with the spoiler 7 in the raised position. The body panel 13, together with other body panels of the vehicle, may comprise reinforcing material 28 contained in a matrix material. The matrix material may bind the reinforcing material together. The reinforcing material 28 may be reinforcing fibres. For example, the body panel may comprise reinforcing fibres held in a resin, the reinforcing fibres may be carbon fibres. Such a construction of the body panel 13 can mean that the body panel 13 can be resiliently deformed from a rest configuration by application of force and can return to that rest configuration once the force has been removed. As shown in FIGS. 7A and 7B, the reinforcing material 28 may be present in the body panel so as to provide strength to the body panel in one plane (into the page in FIGS. 7A and 7B) but permit bending of the body panel in a direction perpendicular to that plane. The reinforcing material 28 may run along a direction in the plane that extends from the first region 14 of the body panel to the second region 15 of the body panel that comprises the spoiler 7. The spoiler 7 extends in a lateral direction across the vehicle and the reinforcing material 28 may run in a direction perpendicular to the lateral extension of the spoiler 7. As shown in FIG. 7B, the body panel bends around the region of the bend line 17 which forms the join between the spoiler and the rest of the body panel 13.

Figure 7C:
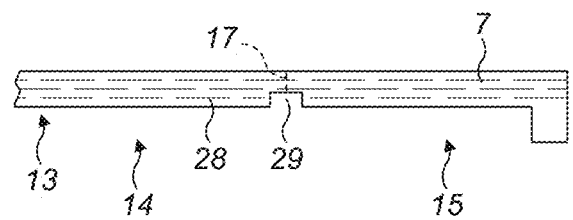

FIG. 7C shows an alternative construction of the body panel comprising the spoiler. In this construction, the body panel comprises a notch 29 in the material of the body panel in the region of the bend line 17 where the spoiler 7 joins the rest of the body panel 13. In this configuration, only some of the reinforcing material 28 runs from the first region 14 to the second region 15. Such a configuration can assist in the bending of the spoiler 7 because less material is present in the front edge of the spoiler 7 where it starts to bend.

Figure 7D:
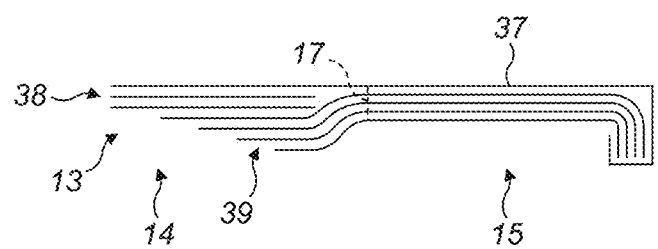

FIG. 7D shows an example reinforcement fibre layup for the body panel comprising the spoiler 7. The body panel may comprise a paint layer 37. This paint layer 37 may extend at least over the upper surface of the body panel. In the first region 14 of the body panel, which is the static part of the body panel, the body panel may comprise two layers of reinforcement material 38. The two layers of reinforcement material 38 may be a first type of reinforcement material, for example it may be made from a first type of material and/or have a first set of material properties such as thickness. In the area where the first region 14 approaches the second region 15, the body panel may have additional layers of reinforcement material attached to it. These additional layers of reinforcement material 39 continue into the second region 15 to form the spoiler 7. The additional layers of reinforcement material 39 may be a second type of reinforcement material, for example it may be made from a second type of material and/or have a second set of material properties such as thickness. There may be four layers of reinforcement material that run from the area of the first region 14 near the second region 15 into the second region 15 to form the spoiler 7. The second type of material may be more flexible than the first type of material. This means that the spoiler starts to bend in the region where only material of the second type is located.

The body panel may comprise a core region and a surface region. The core region may provide the structural integrity to the body panel. The surface region may be a coating to the core region, for instance a paint layer and/or a gel coating.

The body panel may be constructed using other materials as long as there is a seamless, continuous surface between the body panel and the spoiler part of the body panel can be deformed resiliently.

It will be appreciated that although the example of the VADs being present at the rear of the vehicle has been used to explain the present invention that the VAD could form part of other body panels on the vehicle. For instance, at the front of vehicle 1 or on the underside of the vehicle 1.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:
   a vehicle body comprising a first body panel; and
   a first variable aerodynamic device comprising:
      a first spoiler that is resiliently deformable between a lowered position and a raised position, the first spoiler being formed from part of the first body panel; and
      a first actuator configured to move the first spoiler between the lowered position and the raised position;
      a first connecting arm configured to pivot about a rotational axis located at a first position on the first connecting arm, the first connecting arm being pivotally connected to the spoiler at a second position; and
      a second connecting arm connected to the first connecting arm so as to rotate with the first connecting arm and be positionally fixed relative to the first connecting arm, the second connecting arm being pivotally connected to the actuator at a third position, the third position being towards the second position along the second connecting arm.

2. The vehicle according to claim 1, wherein the first body panel comprises a first region and a second region, the first region forming a fixed portion of the vehicle body and the second region forming the first spoiler.

3. The vehicle according to claim 2, wherein the first region and second region of the first body panel are connected together seamlessly.

4. The vehicle according to claim 2, wherein the first body panel is formed of reinforcing material and a matrix material binding the reinforcing material together, and the reinforcing material runs between the first region and the second region.

5. The vehicle according to claim 1, wherein the first body panel forms a hinge for the first spoiler to be resiliently deformable between the lowered position and the raised position.

6. The vehicle according to claim 1, wherein the first spoiler forms a generally arcuate shape in a longitudinal cross-section when in the raised position.

7. The vehicle according to claim 1, wherein the vehicle has a front and a rear, and the spoiler is located at a rear portion of the vehicle.

8. The vehicle according to claim 7, wherein the spoiler has a front and a rear, and the rear of the spoiler forms part of the rear of the vehicle.

9. The vehicle according to claim 1, wherein the vehicle comprises a rear diffuser, the vehicle has an underside and a rear, and the rear diffuser comprises an air channel configured to direct air from the underside of the vehicle to an outlet at the rear of the vehicle, the spoiler being aligned with the outlet of the air channel.

10. The vehicle according to claim 1, the vehicle body comprising a second body panel, and the vehicle comprising a second variable aerodynamic device comprising:
   a second spoiler that is resiliently deformable between a lowered position and a raised position, the second spoiler being formed from part of the second body panel; and
   a second actuator coupled to the second spoiler for moving the spoiler between the lowered position and the raised position.

11. The vehicle according to claim 10, wherein the first body panel and the second body panel are the same body panel.

12. The vehicle according to claim 10, wherein the first spoiler and second spoiler are located on opposite sides of a longitudinal centreline of the vehicle.

13. The vehicle according to claim 10, wherein the first and second spoilers are spaced apart from each other by a portion of the vehicle body.

14. The vehicle according to claim 10, wherein the first and second actuators are mechanically linked to move their respective spoilers in unison.

15. The vehicle according to claim 10, wherein the vehicle comprises a rear diffuser, the vehicle has an underside and a rear, and the rear diffuser comprises: a first air channel configured to direct air from the underside of the vehicle to a first outlet at the rear of the vehicle; and a second air channel configured to direct air from the underside of the vehicle to a second outlet at the rear of the vehicle, the first and second air channels being located on opposite sides of a longitudinal centreline of the vehicle; and the first and second spoilers being aligned with the first and second outlets of the air channels respectively.

16. An automobile having an underside and a rear, the automobile comprising:
an automobile body having a rear;
two variable aerodynamic devices positioned at the rear of the automobile body to either side of a longitudinal centreline of the automobile; and
a rear diffuser comprising: a first air channel configured to direct air from the underside of the vehicle to a first outlet at the rear of the vehicle; and a second air channel configured to direct air from the underside of the vehicle to a second outlet at the rear of the vehicle, the first and second air channels being located on opposite sides of a longitudinal centreline of the vehicle; and the two variable aerodynamic devices each being aligned with a respective one of the first and second outlets of the air channels.

17. The automobile as claimed in claim 16, wherein each of the two variable aerodynamic devices are formed from first portions of the automobile body, and the two variable aerodynamic devices are spaced apart from each other by a second portion of the automobile body.

18. A vehicle comprising:
a vehicle body comprising a first body panel and a second body panel; and
a first variable aerodynamic device and a second variable aerodynamic device;
the first variable aerodynamic device comprising:
a first spoiler that is resiliently deformable between a lowered position and a raised position, the first spoiler being formed from part of the first body panel;
a first actuator configured to move the first spoiler between the lowered position and the raised position;
the second variable aerodynamic device comprising:
a second spoiler that is resiliently deformable between a lowered position and a raised position, the second spoiler being formed from part of the second body panel; and
a second actuator coupled to the second spoiler for moving the spoiler between the lowered position and the raised position.

19. The vehicle according to claim 18, wherein the first body panel and the second body panel are the same body panel.

20. The vehicle according to claim 18, wherein the first spoiler and second spoiler are located on opposite sides of a longitudinal centreline of the vehicle.

21. The vehicle according to claim 18, wherein the first and second spoilers are spaced apart from each other by a portion of the vehicle body.

22. The vehicle according to claim 18, wherein the first and second actuators are mechanically linked to move their respective spoilers in unison.

* * * * *